Figure 1:
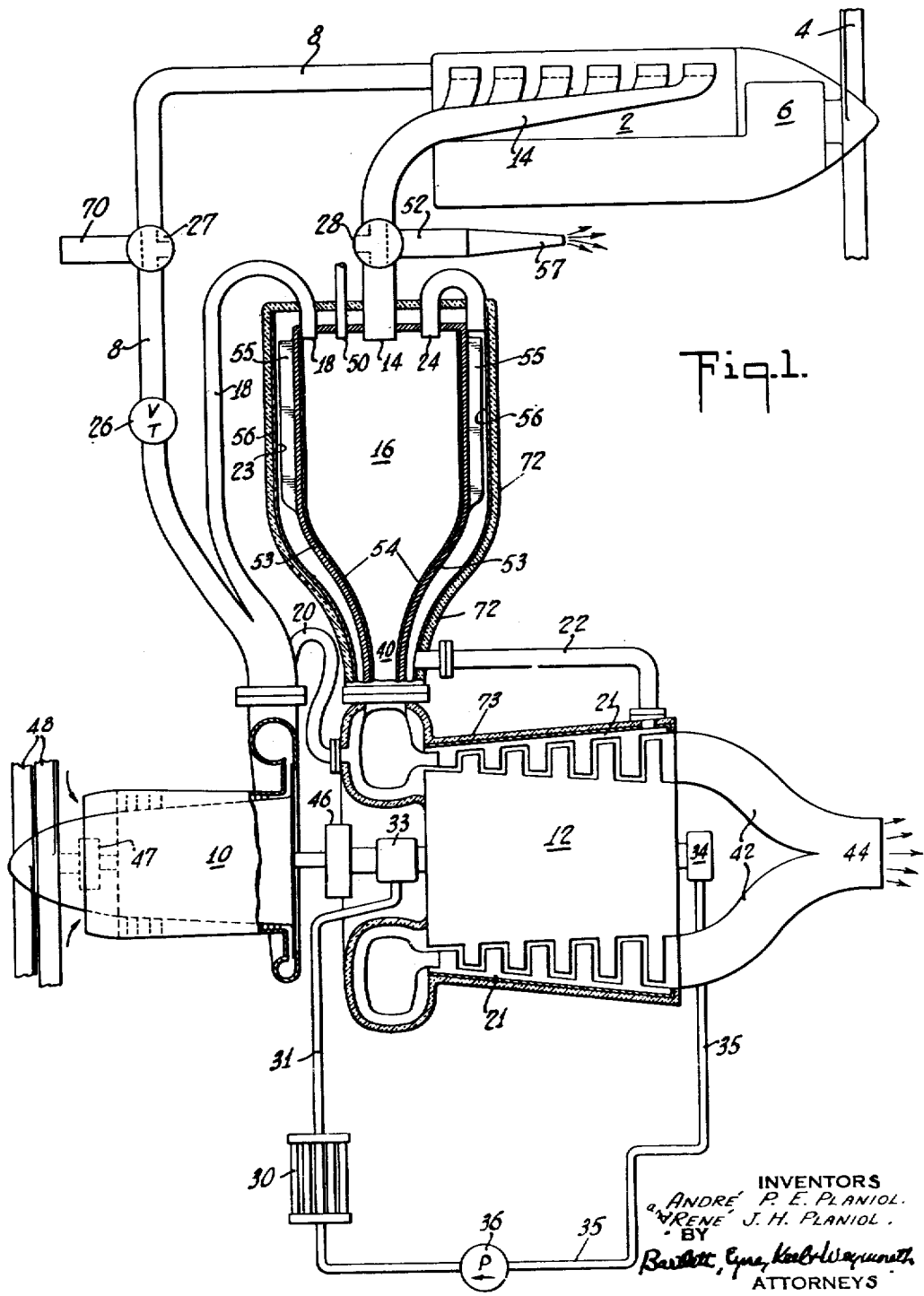

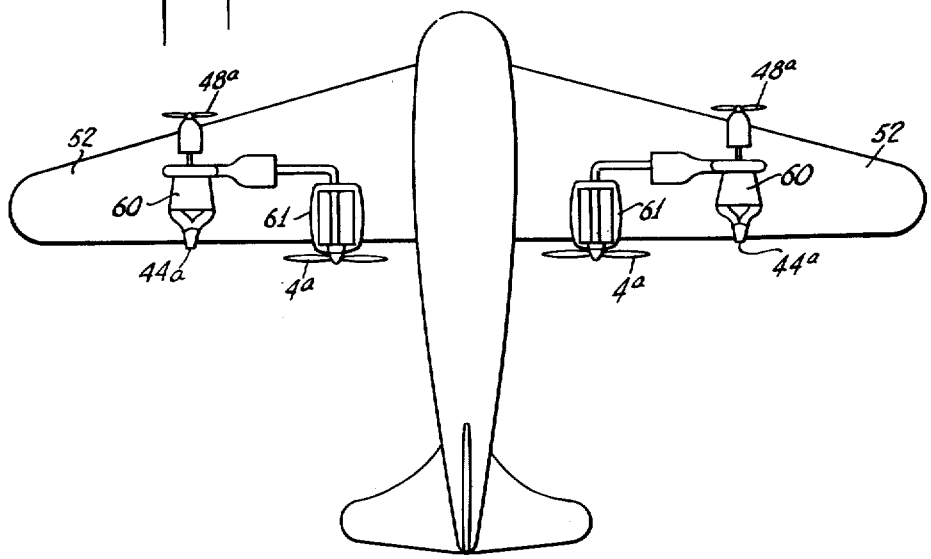
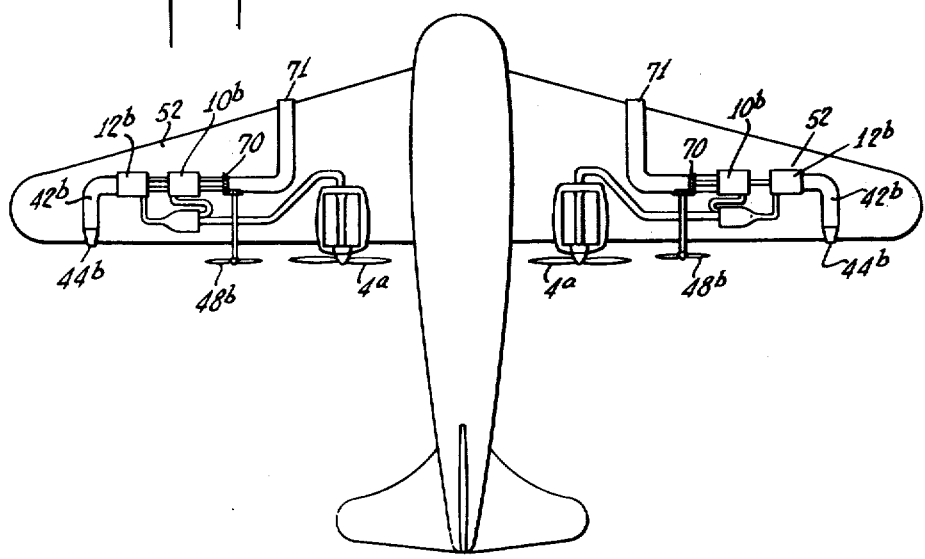

Patented Nov. 19, 1946

2,411,227

UNITED STATES PATENT OFFICE 2,411,227

POWER PLANT FOR AIRPLANES

André P. E. Planiol, Huntington, and René J. H. Planiol, New York, N. Y.

Application November 17, 1941, Serial No. 419,463

1 Claim. (Cl. 170—135.5)

The present invention comprises an improved power plant for airplanes. The new power plant is characterized by a reduction of fuel consumption, and by increased power at take-off and at rated altitude. The new power plant also insures quick pick-up of the airplane engine after throttling and permits a plane equipped therewith to fly at altitudes higher than those at which airplanes equipped with the usual power plants can now fly.

Briefly stated, the new power plant is designed to insure complete combustion of the engine fuel, as distinguished from the substantially 50% combustion now obtained with rich mixtures, to utilize the additional power thereby obtained to increase the power of the exhaust turbine and then to utilize the excess power thus given to the turbine for assisting in the propulsion of the airplane.

For a better understanding of the invention, reference may be had to the accompanying drawings, of which Fig. 1 is a view, partly diagrammatic, representing one embodiment of the invention; and Figs. 2 and 3 are diagrammatic plan views of airplanes illustrating two possible locations of the new power plants therein.

In Fig. 1 the airplane engine is indicated diagrammatically at 2 as driving the propeller 4 through the usual gear box 6. The engine 2, which may be of any usual construction, receives air for combustion through a pipe 8 from a supercharger 10 driven by an exhaust turbine 12. Gases of combustion pass from the engine through a pipe 14 to a mixing chamber 16.

The gases in pipe 14 are only partly burned. Ordinarily not more than 50% of the chemical energy of the fuel is transformed into heat inside the engine if the mixture delivered by the carburetors is rich and it is well known that if the power given by the engine has to be near the maximum a rich mixture is necessary to avoid undue heating of the engine. In accordance with the invention, these exhaust gases, instead of being delivered either directly to the exhaust turbine 12 or thereto after passing through a cooling device, are first completely burned in the mixing chamber 16 to which air for this combustion is delivered directly from the supercharger 10 by means of a branch pipe 18. The burning of these gases in the mixing chamber substantially raises the temperature of the gases for delivery to the turbine 12. Unless the turbine 12 is designed to withstand these very high temperatures, a substantial excess of air must be delivered to the mixing chamber so that the gases after being completely burned will be cooled by the air not needed for this combustion. Preferably, however, the turbine 12 is so constructed as to withstand high temperatures. Such a turbine, in which both the moving and stationary elements are cooled, is disclosed in our copending United States application Serial No. 419,464, filed on even date herewith, now Patent 2,369,795, issued February 20, 1945, and it is this construction which we prefer to employ in the power plant of the present invention.

In the particular embodiment of the invention the cooling medium for the fixed blades of the turbine is air which is introduced through the pipe 20 from the supercharger and delivered to the cooling jacket 21 of the turbine. Instead of air, water or other liquid could as well be employed for this purpose.

From the turbine jacket 21 the air passes through a pipe 22 to an annular chamber 23 formed between double walls of the mixing chamber 16. The air thus preheated by the cooling of the turbine and of the mixing chamber is then sent inside the mixing chamber through a pipe 24 to take part in the combustion of exhaust gases. The moving elements of the turbine are liquid cooled as indicated in our patent application Serial No. 419,464. The cooling liquid, after passing through a radiator 30 and pipe 31, enters a hollow rotating part of the turbine shaft through a bearing 33. The liquid leaves the rotating element at a bearing 34 and returns through a pipe 35 and pump 36 back to the radiator 30. As this construction forms no part of our present invention, the fluid passages within the rotating elements of the turbine have not been illustrated. For details of the turbine construction, reference may be had to our above referred to copending application. With such an exhaust turbine but a slight excess of air beyond that required for completing the combustion of the exhaust gases need be delivered to the mixing chamber.

A throttle 26 is provided in the air line 8 for control of the air to the engine. A two position valve 27 which allows the engine to receive air either from the supercharger through the pipe 8 or directly from the outside atmosphere through a branch pipe 70 is also provided in the air line 8. A two position valve 28 is provided also in the exhaust line 14. Valve 28 in one position connects line 14 to the mixing chamber 16 and in its other position cuts off the mixing chamber and exhausts the engine gases directly to atmosphere through a branch pipe 52 and a nozzle 57 giving a jet propulsion effect for a purpose hereinafter to be described.

The mixing chamber 16 is built to withstand the high temperatures generated therein. It has an inner wall 53 of metal able to resist very high temperatures, as for example, stainless steel or other heat-resisting material. Upon the inside of the wall 53 is a relatively thick coating 54 of ceramic material, and upon the outside of wall 53 are vanes 55 for dissemination of heat. This inner wall, together with an outer wall 56, defines the annular passage 23 through which the air from pipe 22 is first passed before introduction with the exhaust gases into the mixing chamber. This arrangement serves the double purpose of cooling the walls of the mixing chamber so that the tensile strength thereof will be maintained and of preheating the air for the combustion within the chamber. By a proper adjustment of the thickness of wall 53, size of fins 55, thickness of coating 54, and speed of air flow through annular space 23, it is possible to adjust the temperature of the walls of the mixing chamber at the best value. This value has to be as high as possible in order to avoid losses of heat of the burning gases. The cooling of these gases corresponds to a loss in the power given by the turbine. This loss is minimized by the transfer of heat from the walls not to a separate cooling fluid but to the air which brings the heat back to the general cycle of the machine. The losses of heat are also reduced by using an external insulating envelope 72 of asbestos or the like for the combustion chamber and a similar envelope 73 for the turbine.

In Fig. 1 both the mixing chamber and the stationary parts of the turbine are indicated as successively cooled by the same air steam whereas additional air for combustion in the chamber 16 is indicated as being delivered directly through the pipe 18. If desired, however, the cooling of the chamber 16 and fixed parts of the turbine could be effected by parallel air streams instead of by the series arrangement illustrated. For example, the pipes 22 and 24 could be connected directly together and pipe 18 could be so connected as to cause the air therein to traverse the annular chamber 23 before entering the combustion chamber 16.

After combustion in the mixing chamber 16 the gases and any air in excess of that required for the combustion passes to the turbine 12 through the line 40 and after expansion therein is delivered through a line 42 terminating in a jet 44 directed rearwardly of the plane.

The turbine 12 thus receives a large volume of gases at relatively high temperatures, with the result that more power can be obtained therefrom than is required for driving the supercharger 10. In accordance with the invention this excess power is utilized to aid in the propulsion of the airplane and also to give stability to the system. In the particular embodiment of the invention illustrated, which is that preferred, the turbine is arranged through suitable gear reduction 46 to drive the supercharger 10 and through another gear reduction 47 to drive propellers 48 preferably of the counter-rotating type as indicated in the drawings. Instead of driving separate propellers, the excess power of the turbine could be coupled back to the engine shaft through mechanical, fluid or electric means, but the efficiency of such an arrangement would not be as high as when the turbine is connected for direct driving of one or more independent propellers, as the weight of either hydraulic or electric coupling means would be excessive, and flexibility of the system with mechanical coupling would be impaired.

Before describing the method of operation at take-off and the improvements effected in the take-off by the new power plant, the advantages inherent in the new system during flying will first be discussed.

As is well known, the higher the altitude the greater must be the size of the propeller for the same motive effect upon the airplane, because of the lower atmospheric pressure. There is a limit to the tip speed at which propellers may be effectively driven at very high altitudes, which speed is that of the velocity of sound which is progressively lower as the air becomes less dense and as temperature becomes lower and lower. To overcome this difficulty, either the propellers would need to be larger to increase their power for a given tip speed, or more propellers would need to be provided. No substantial increase in propeller size is practicable because requiring undue length in landing gear to permit clearance of the ground by the propeller when the plane lands. Additional propellers have heretofore required additional engines, each engine being of a smaller size for a given total power on board the plane. With the power plant of the present invention additional propellers are provided and these additional propellers are operated by the excess power delivered by the turbine obtained by completing the combustion of the engine gases. Any type of variable pitch propeller for the turbine may be used. For very high altitude flying, we prefer to use two counter rotating propellers on each turbine shaft. The arrangement has many advantages: For a given size of the propellers it is possible to increase the total power. When the pitch is very high, which is necessary to decrease the tip speed when the plane is flying very fast, the efficiency is slightly increased. There is also an increase in the total surface of the blades bringing also a possibility of slight decrease of the size for a given power.

The most important feature of the new invention is that the excess of power given by the turbine does not require any fuel consumption, as the energy of the turbine comes from the unburned exhaust gases of the engine. In other words for a given power the fuel consumption is materially reduced, or for a given fuel consumption substantially more power is obtained. At 50,000 feet, for example, the atmospheric pressure is about one-tenth of the pressure at sea-level, while the pressure of the exhaust gases delivered to the turbine is about that of the atmosphere at sea level. The turbine thus operates with an expansion coefficient of about 10 to 1 and will deliver about the same power as the engine. The thermal efficiency of the turbine, for this expansion coefficient of 10 to 1 is about the same as that of the engine. Calculations we have made show that for normal flying conditions the new power plant can reduce the fuel consumption by as much as 30 to 40%.

Another, and important, advantage of the new power plant is the increase in engine pick-up which is obtained thereby. This will be apparent if one considers the case of a military plane, for example, after the engine has been throttled for a dive and the pilot then wishes to start his engine again quickly. In the usual case, where the exhaust turbine merely drives the supercharger, the throttling of the engine reduces the turbine speed to such an extent that the supercharger cannot deliver sufficient air to the engine when the throttle is again opened. Consequently the pilot must dive again to speed up the turbine. With the new power plant, during the first dive with the engine throttled, the propeller 48 will drive the turbine with the result that when the engine throttle is again opened the supercharger is effective to supply air for quick speed-up of the engine.

Contrary to what is now happening with normal turbo driven superchargers, it is even possible to increase the speed of the turbo machine during the time in which it is not used to feed the throttled engine. This is very easily done by slightly decreasing the pitch of the turbine's propeller. Thus when the pilot will again open the throttle the pressure in the inlet manifold will be above its normal value and the pick-up will be made with a greater power. The turbo machine, fed with exhaust gases at pressures higher than the normal will also give a greater power and its propeller's pitch, being below the normal, the traction of all the power plant will be substantially increased above its normal value.

The provisions of a propeller driven by the exhaust turbine also makes possible a continuously changing speed ratio between engine and turbomachine, as the relative pitches of the two propellers may be changed at will. Thus the best speed and power adjustments of the machines may be made to suit every flying condition.

At take-off, due to the low or zero pressure differential across the turbine, the conditions are different and hence the invention includes means for varying the system at this time, which means effectively increase the power at take-off. Referring again to Fig. 1, there will be noted an injector 50 for introducing liquid fuel directly into the mixing chamber. This injector is used only at take-off or for flying at very low levels. Assume the power plant of the airplane to be composed of two units, each such as shown in Fig. 1, that is the plant has two engines and two turbines each operatively connected with propellers. When the airplane is on the ground the valve 27 is turned and the engine takes the air directly from the atmosphere through 70 and 8 and the engines are started in the normal way to run idling. The exhaust gases from the engines start the turbines which begin to run slowly. The pitch of the turbine propellers is set for zero so that the resisting torque is negligible, permitting the turbo machines to increase slightly in speed. When the speed of the turbine is sufficiently high the valves 28 in the exhaust lines 14 are turned to exhaust the engine gases to atmosphere through the pipes 52 which, as shown, terminates in a jet 51, and to shut off the gases from the mixing chamber. Simultaneously liquid fuel is injected into the mixing chambers through the injectors 50 with the result that the turbines 12 now operate as gas turbines instead of operating as exhaust turbines. Gradually increasing the delivery of fuel to the chambers increases the speed of the turbines and as a result the outlet pressure of the superchargers. As this outlet pressure increases, valves 27 are turned to connect the supercharger with the engine and throttles 26 are operated to cut down the air supply to the engines and thereby avoid excessive pressure in the inlet manifolds thereof. The pilot now has complete control of both of the engines in the normal way, as when the turbo machines are not in use, and of the turbines by the control of the fuel thereto and the plane is ready to take off. The pilot therefore adjusts all the propellers for short pitch and increases the speed of the engines and turbines simultaneously. Because of the increase in density of the fluid supplied to the turbines by the direct injection of fuel into the mixing chambers, the turbines will develop substantial power equal to or in excess of that developed by the engines. Consequently the plane will take off easily. After the plane leaves the ground the amount of fuel injected into the mixing chambers is gradually decreased. This decreases the pressure therein and when such pressure falls below the normal intake manifold pressure for which the engine is designed, valves 28 are operated to cause the engine exhaust gases to be delivered directly to the mixing chambers. As the plane continues to gain altitude, the amount of fuel delivered through nozzles 50 is further reduced and finally stopped completely, at which time normal flying conditions prevail.

The above described operations involving the control of throttles 26, valves 27 and 28 and the delivery of fuel to the injectors 50 could be manually performed by the pilot or could of course be performed automatically in response to the pressure in the mixing chambers and inlet manifolds of the engines, and to other variables if desired.

The general features of the new power plant have now been described in connection with Fig. 1. The various parts thereof may be located at any convenient point on the plane, and the number of plants employed will depend, of course, upon the size of airplane and power desired. There may be the same number of engines and turbines, or there may be additional engines on the plant. Such additional engines could be independent of the turbines, or, if sufficiently large turbines are employed, one turbine could receive the exhaust gases from two engines.

Due to the relatively high mass of the rotating parts of turbine and supercharger and due also to the high angular velocities of these two machines, the gyroscopic torques appearing during the quick evolutions of the plane may be unduly high. It is possible to decrease or even suppress completely these torques by rotating the turbine and the supercharger in opposite directions and by increasing, if necessary, the inertia of one or the other of these machines. As the supercharger is smaller than the turbine it is generally useful to rotate it faster than the turbine, to obtain the best efficiencies for both the machines. By using this counter-rotating disposition the common framework of the two machines transmits to the plane only the difference of the two gyroscopic torques.

It is well known that for a body having a moment of inertia $I$, rotating with an angular velocity $w$, the gyroscopic torque is proportional to $I \times w$. If $I_1 w_1$ applies to the turbine and $I_2 w_2$ to the supercharger, then the resulting gyroscopic torque, if the machines are rotating in opposite directions, will be proportional to $$I_1 w_1 - I_2 w_2$$

The resulting torque may be eliminated by suitably adding to the inertia of the supercharger, or to the inertia of the turbine, if it is found that the natural compensation obtained from the counter rotation of the two machines is not accurate enough.

Thus, in our new power plant, gear box 46 preferably includes reversing gears so that the supercharger and turbine rotate in opposite directions.

In Fig. 2 is illustrated diagrammatically a convenient arrangement of the new power plant in an airplane. In Fig. 2 the various piping connections have been omitted for simplicity. In this arrangement the propellers 48a driven by the turbines are indicated as of the puller type, being located on the leading edge of the wings 52 while the propellers 4a of the engines are of the pusher type, being located on the trailing edge of the wing.

For very high altitude flying, it might be preferable to have all the propellers on the trailing edge and this disposition will be described in Fig. 3.

In Fig. 2 only two engines and two turbines are indicated but for very high altitudes, as explained above, a greater number of propellers would be employed. Four engines and four turbines would be a good arrangement.

In Fig. 2 the turbo machine is located in a cowling 60, smaller than the cowling 61 housing the engines due to the fact that for the same power the turbo machine is smaller than the engine.

At 44a is the exhaust of expanded gases coming from the turbine and giving the jet propulsion.

In Fig. 3 the exhaust turbines and the superchargers operated thereby, indicated diagrammatically at 12b and 10b, respectively, are positioned for rotation about axes at right angles to the direction of flight, and the shafts thereof are coupled by spur gearing 70 to the shafts of propellers 48b. By providing channels 71 leading to the forward ede, air can be delivered directly to the superchargers, and by providing the outlet ducts 42b terminating at the trailing edge of the wing in nozzles 44b, jet propulsion following a first stage expansion of the exhaust gases in the turbines, is added to the already high power of the unit.

The particular shape to be given to nozzles 44, 44a or 44b will depend upon the expected speed of the exhaust gases issuing therethrough. Where the intended speed is below that of the velocity of sound at the temperature of the gases, convergent nozzles are preferred, but where speeds higher than that of the velocity of sound are expected, then the nozzles should have the deLaval convergent-divergent form.

From the above description it will be apparent that the invention provides a practical and efficient power plant having all the important features and advantages heretofore specified, and that these advantages are primarily due to the provision of means for causing complete combustion of the engine exhaust gases together with the means for utilizing the additional power obtained by such complete combustion.

We claim:

In a power plant for airplanes, the combination comprising an internal combustion engine, a propeller driven thereby, a turbine having elements fluid cooled to withstand high temperatures, a propeller driven by said turbine, a gas mixing and combustion chamber having an inlet and an outlet, a supercharger driven by said turbine, means for injecting liquid fuel into said chamber, said supercharger being connected to the inlet of said chamber and said turbine being connected with the outlet of said chamber, a connection between said supercharger and said engine, valve means in said connection adapted in one position to permit flow of air from said supercharger to said engine and in another position to cut off said supercharger from the engine and connect the engine to atmosphere, a connection between said engine and the inlet of said chamber and valve means in said last mentioned connection adapted in one position to permit flow of exhaust gases from said engine to said chamber and in another position to cut off said chamber from said engine and deliver the engine exhaust gases to the atmosphere, whereby said turbine may be operated either as an exhaust turbine or as a combustion turbine, depending upon the position of said valve means and upon the delivery of fuel to said chamber.

ANDRÉ P. E. PLANIOL.
RENÉ J. H. PLANIOL.

Certificate of Correction

Patent No. 2,411,227.  November 19, 1946.

ANDRÉ P. E. PLANIOL ET AL.

It is hereby certified that errors appear in the printed specification of the above numbered patent requiring correction as follows: Column 3, line 38, for the word "steam" read *stream*; column 7, line 35, for "ede" read *edge*; and that the said Letters Patent should be read with these corrections therein that the same may conform to the record of the case in the Patent Office.

Signed and sealed this 4th day of February, A. D. 1947.

[SEAL]

LESLIE FRAZER,
*First Assistant Commissioner of Patents.*

In Fig. 2 is illustrated diagrammatically a convenient arrangement of the new power plant in an airplane. In Fig. 2 the various piping connections have been omitted for simplicity. In this arrangement the propellers 48a driven by the turbines are indicated as of the puller type, being located on the leading edge of the wings 52 while the propellers 4a of the engines are of the pusher type, being located on the trailing edge of the wing.

For very high altitude flying, it might be preferable to have all the propellers on the trailing edge and this disposition will be described in Fig. 3.

In Fig. 2 only two engines and two turbines are indicated but for very high altitudes, as explained above, a greater number of propellers would be employed. Four engines and four turbines would be a good arrangement.

In Fig. 2 the turbo machine is located in a cowling 60, smaller than the cowling 61 housing the engines due to the fact that for the same power the turbo machine is smaller than the engine.

At 44a is the exhaust of expanded gases coming from the turbine and giving the jet propulsion.

In Fig. 3 the exhaust turbines and the superchargers operated thereby, indicated diagrammatically at 12b and 10b, respectively, are positioned for rotation about axes at right angles to the direction of flight, and the shafts thereof are coupled by spur gearing 70 to the shafts of propellers 48b. By providing channels 71 leading to the forward ede, air can be delivered directly to the superchargers, and by providing the outlet ducts 42b terminating at the trailing edge of the wing in nozzles 44b, jet propulsion following a first stage expansion of the exhaust gases in the turbines, is added to the already high power of the unit.

The particular shape to be given to nozzles 44, 44a or 44b will depend upon the expected speed of the exhaust gases issuing therethrough. Where the intended speed is below that of the velocity of sound at the temperature of the gases, convergent nozzles are preferred, but where speeds higher than that of the velocity of sound are expected, then the nozzles should have the deLaval convergent-divergent form.

From the above description it will be apparent that the invention provides a practical and efficient power plant having all the important features and advantages heretofore specified, and that these advantages are primarily due to the provision of means for causing complete combustion of the engine exhaust gases together with the means for utilizing the additional power obtained by such complete combustion.

We claim:

In a power plant for airplanes, the combination comprising an internal combustion engine, a propeller driven thereby, a turbine having elements fluid cooled to withstand high temperatures, a propeller driven by said turbine, a gas mixing and combustion chamber having an inlet and an outlet, a supercharger driven by said turbine, means for injecting liquid fuel into said chamber, said supercharger being connected to the inlet of said chamber and said turbine being connected with the outlet of said chamber, a connection between said supercharger and said engine, valve means in said connection adapted in one position to permit flow of air from said supercharger to said engine and in another position to cut off said supercharger from the engine and connect the engine to atmosphere, a connection between said engine and the inlet of said chamber and valve means in said last mentioned connection adapted in one position to permit flow of exhaust gases from said engine to said chamber and in another position to cut off said chamber from said engine and deliver the engine exhaust gases to the atmosphere, whereby said turbine may be operated either as an exhaust turbine or as a combustion turbine, depending upon the position of said valve means and upon the delivery of fuel to said chamber.

ANDRÉ P. E. PLANIOL.
RENÉ J. H. PLANIOL.

---

Certificate of Correction

Patent No. 2,411,227.　　　　　　　　　　　　　November 19, 1946.

ANDRÉ P. E. PLANIOL ET AL.

It is hereby certified that errors appear in the printed specification of the above numbered patent requiring correction as follows: Column 3, line 38, for the word "steam" read *stream*; column 7, line 35, for "ede" read *edge*; and that the said Letters Patent should be read with these corrections therein that the same may conform to the record of the case in the Patent Office.

Signed and sealed this 4th day of February, A. D. 1947.

[SEAL]

LESLIE FRAZER,
*First Assistant Commissioner of Patents.*